Patented Nov. 13, 1945

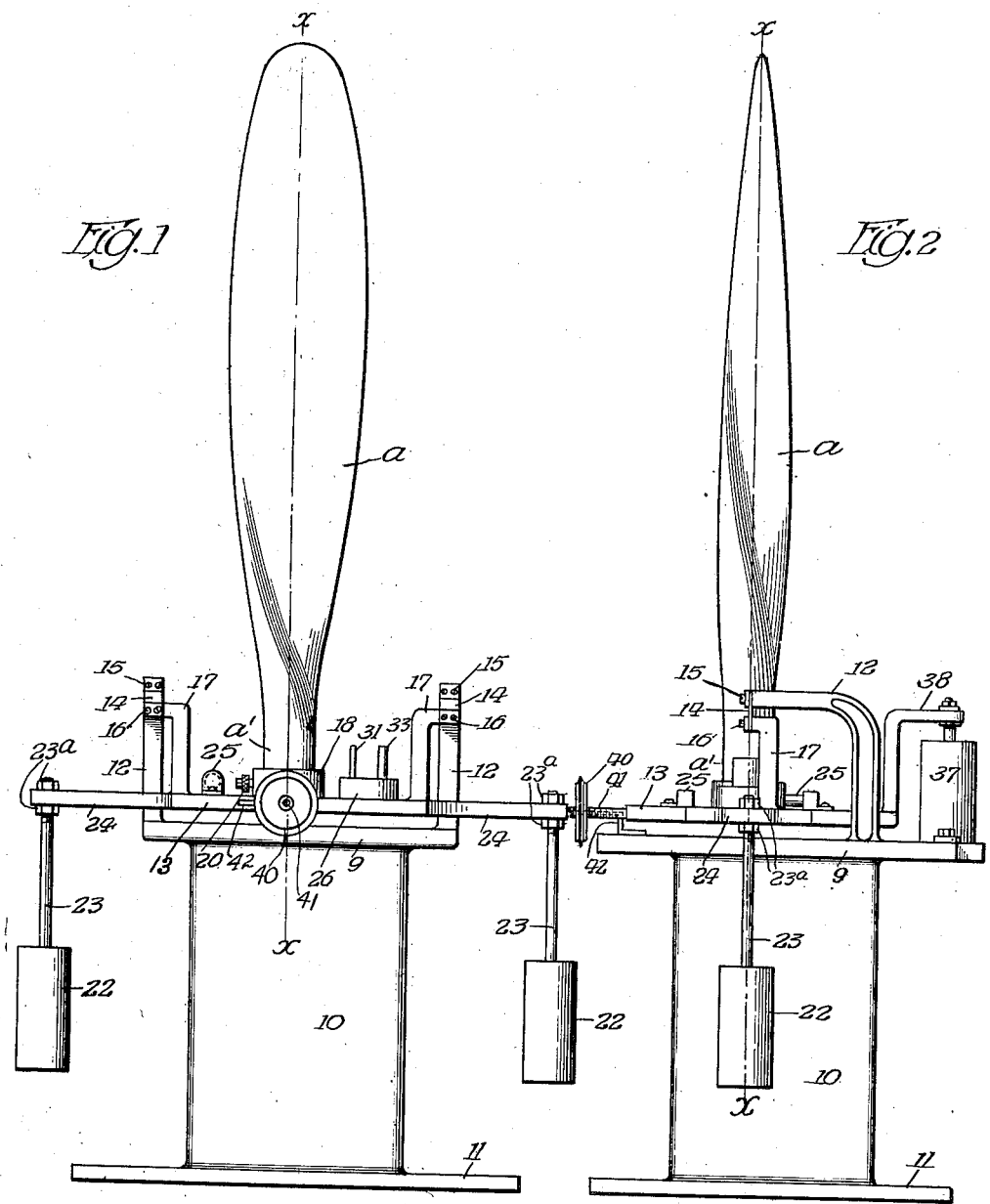

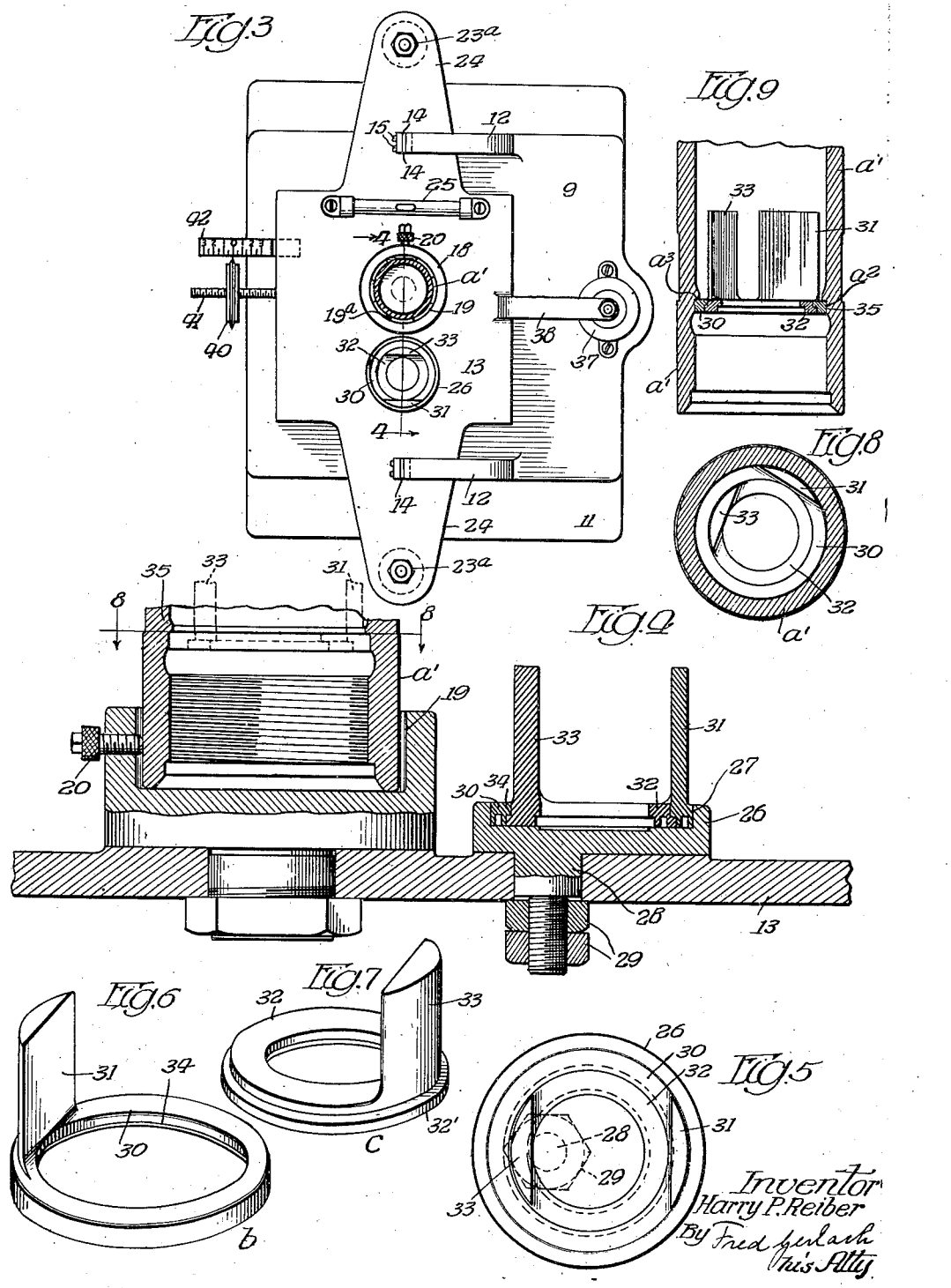

2,388,705

UNITED STATES PATENT OFFICE 2,388,705

APPARATUS FOR BALANCING PROPELLER BLADES

Harry P. Reiber, Toledo, Ohio, assignor to The Aviation Corporation, New York, N. Y., a corporation of Delaware Application November 5, 1942, Serial No. 464,581

6 Claims. (Cl. 73—66)

The invention relates to balancing propeller blades and more particularly for static balance about their longitudinal axes.

One object of the invention is to provide improved mechanism for determining the amount of unbalance of a propeller blade or similar article.

Another object of the invention is to provide an improved apparatus for facilitating the correct location in a blade of weights for compensating for unbalance in the blade.

Another object of the invention is to provide mechanism for determining the amount of unbalance of a propeller blade with means for receiving weights which are adapted for subsequent fixation in the blade so that errors of calculation may be corrected by the operator and the effect of the added weights checked.

Another object of the invention is to provide mechanism for determining the amount of unbalance of a propeller blade with means whereby counter-balancing weights may be easily and visually manipulated into positions by the operator to accurately compensate for blade unbalance and which is constructed so that the weights may be removed and transferred to the correct positions in the blade for compensating for the unbalance.

Another object of the invention is to provide improved mechanism for determining the amount of unbalance of a propeller blade in which a plurality of standard eccentric weights may be manipulated by the operator apart from the blade to compensate for the unbalance of the blade and which is so constructed that subsequent to such manipulation these weights may be transferred to the corresponding positions in the blade for effecting balance.

A still further object of the invention is to improve balancing a propeller blade around its longitudinal axis by the addition of a pair of eccentric weights in different radial directions to compensate for unbalance in different magnitudes in any portion of the blade, by placing the weights in plain sight of the operator in correct relative radial directions relatively to the axis of the blade corresponding to those in which they will compensate for the unbalance preparatory to transfer to and fixation in the blade in corresponding positions.

Another object of the invention is to provide an improved machine for use in balancing a propeller blade about its longitudinal axis by the addition of weights of predetermined moments which includes means for visibly positioning the weights in positions corresponding to those in which they compensate for any unbalance so their compensating effect can be determined before they are permanently fixed in the blade.

Other objects of the invention will appear from the detailed description.

The invention consists in the several novel features which are hereinafter set forth and more particularly defined by claims at the conclusion hereof.

In the drawings:

Figure 1 is a front elevation of a machine exemplifying the invention.

Figure 2 is a side elevation.

Figure 3 is a plan view, the propeller blade being shown in section.

Figure 4 is a section taken on line 4—4 of Figure 3.

Figure 5 is a plan view of the holder for the eccentric weights with the weights therein.

Figure 6 is a perspective of one of the weights.

Figure 7 is a perspective of the other weight.

Figure 8 is a horizontal section of the blade taken on line 8—8 of Figure 4 with the weights secured therein.

Figure 9 is a longitudinal section of a portion of the blade with the weights fixed therein.

The invention is adapted for use in balancing a propeller blade $a$ which is provided with a hollow shank $a^1$ whereby the blade can be suitably mounted in a propeller hub. The blade is supported vertically so that it will be free to swing across a vertical axial plane by and in the direction of any unbalance on opposite sides of that plane. The blade is successively supported to swing across vertical axial planes which are preferably perpendicular to each other for determining the magnitude and direction of the unbalance.

The invention is adapted for use with a sectional mass which comprises a pair of eccentric weights which are subsequently to be added to each blade and which may be manipulated to compensate for any probable unbalance either in direction or magnitude in any portion of the blade by variation of the radial directions of the weights in the blade. The mass used for statically balancing the blade about its longitudinal axis comprises a pair of sections $b$ and $c$, each of which has an integral weight 31, 33, respectively. Section $b$ comprises a ring 30, usually of metal, the inner face of which is adapted to abut against the annular shoulder $a^3$ in the shank $a^1$ to position it longitudinally therein, and has a cylindrical periphery which is adapted to fit into the internal periphery $a^2$ of the shank so that the ring will be rotatable concentrically to any position in the shank $a^1$. The eccentric weight 31 is integral and projects longitudinally outward from ring 30, is rotatable to any radial direction with the ring, has an outer arcuate face concentric with the longitudinal axis of the blade, and has a chordal inner face. The section c comprises a ring 32 having a cylindrical periphery fitting in ring 30 and an annular flange $32^1$ which fits in a counterbore 34 in the inner face of ring 30, and an integral eccentric weight 33. Weight 33 is eccentrically located, is rotatable to any radial direction with section c, projects longitudinally outward from ring 32, has an arcuate outer face concentric with the longitudinal axis of the blade, and has a chordal inner face. These weights 31, 33, are located at different distances from the axis of the blade so they are rotatable past each other and so each can be set in any radial direction around the axis of the blade, and are preferably of the same length. The balancing effect of each weight about the longitudinal axis of the blade is a product of its mass, times the distance of the center of mass from the longitudinal axis of the blade. The mass of the inner weight 33 on the shorter radius is greater than the mass of the outer weight 31 on the greater radius and the weights are proportioned to produce equal balancing moment when they are diametrically opposite. Rings 30 and 32 may be provided with sockets for receiving a turning tool or wrench for rotating them in the shank. This construction adapts the weights for rotative positioning in the shank and relatively to each other in any radial direction to compensate for unbalance of any magnitude in any direction to statically balance the blade around its longitudinal axis and which may be soldered for permanent attachment to the blade thereafter.

The machine for use in balancing blades with the mass-sections b and c described, comprises a stationary bed 9 supported on a pedestal 10 which is provided with a base 11. A horizontal blade-supporting cradle or table 13 is pivotally suspended, for oscillation across a vertical axial plane, from angular arms 12 which are fixed to the bed 9. The upper ends of a pair of transversely aligned flat springs or resilient strips 14 are secured by screw-clamps 15 to the inner ends of arms 12 and their lower ends are secured by screw-clamps 16 to the upper ends of hangers or suspension arms 17 which are fixed to and extend upwardly from the cradle 13. These suspension devices act as pivot means to permit the table 13 to swing across the transverse vertical plane which intersects the strips 14. Fixedly secured to the top of the cradle 13 is a symmetrical chuck 18 which is provided with a centrally positioned upwardly facing socket 19 in which the shank of the blade is secured. The axis of the socket 19 coincides with the blade-axis X—X and is located normally in the transverse vertical plane extending through the strips 14 so that equal portions of the chuck will be disposed on opposite sides of said plane for balance so the chuck will be free to be swung with the cradle across said plane by any unbalance in the blade. The shank of the blade is coaxially positioned in socket 19 by ribs $19^a$ and a set-screw 20 is adapted to fixedly secure the shank in its coaxial position in the socket. The blade, when the screw 20 is released, can be rotated in the socket 19 so that the blade may be tested for balance in different vertical axial planes, usually perpendicular to each other. Counter-weights 22 are suspended from and fixed to rods 23. The upper end of rods 23 are fixedly secured in laterally extending arms 24 on the cradle 13 in transverse alignment with leaf-springs 14. These weights are adapted to act as pendulums to avoid excessive swinging movement of the cradle and the blade and to permit the blade to be swung by any unbalance on opposite sides of the plane across which the cradle and blade are free to swing.

The rods 23 which carry the pendulum weights 22 are vertically adjustable in the arms or extensions 24 of the cradle 13 by means of nuts $23^a$ so that the weights $22^a$ can be set to control the sensitivity of the balancing operation. An oil dashpot 37 may be used to steady, or damper the movement of the cradle. The piston of this dashpot is connected by an arm 38 on the rear of cradle 13 and is constructed so that it will retard the rate of movement, but will not prevent the cradle fom tilting responsively to the unbalance in the blade.

A spirit level 25 is mounted at one side of and on the top of the cradle 13 to indicate when the table is level and the longitudinal axis of the blade a is vertical. This level extends across the transverse vertical plane of the springs 14 and the axis of chuck 18 and indicates the direction and extent of the swing of the cradle 13 and roughly the unbalance of the blade.

The machine thus far described is used to support the blade with its longitudinal axis vertical, as indicated by the line X—X, for measuring the magnitude of unbalance in the blade about its longitudinal axis for determination of the radial direction in which the weights b, c, when placed in the shank of the blade, will compensate for the unbalance.

By supporting the blade for measure of its unbalance in an upright position greater sensitivity is attained in the movement of the blade caused by the unbalance.

The unbalance is usually measured in units of an ounce inch which is the unbalance due to a weight of one ounce located a radial distance of one inch from the axis of the blade. A gauge for measuring the unbalance in the blade by measuring the force necessary to maintain the cradle level comprises a weight 40 which is screw-threaded to a stem 41 and is fixed to and moves with the cradle 13, and an indexed scale 42 which is also fixed to the cradle 13. The cradle 13 will be shifted by the blade according to the magnitude of the unbalance, and the weight 40 which is normally set so the cradle will be balanced, will move with the cradle. The weight 40 can be rotated on the screw 41 to move toward and from the balanced position of the cradle to compensate for the unbalance due to any inaccuracies present in physical dimensions of the blade. When this is done the weight will be shifted from its neutral point on the scale 42 which may be calibrated in ounce inches until the blade and cradle are vertical. The distance which the weight 40 has been shifted will be indicated on the scale 42 and thus the magnitude of the unbalance will be measured. After the unbalance of the blade has been measured in one position, the blade will be rotated 90° in the chuck 18 and the unbalance of the blade across this perpendicular plane will then be similarly measured. The two rectangular components of the force which produces the unbalance by these tests in axial planes which are perpendicular to each other are thus determined by these measurements. The location and the magnitude of the unbalance is determined by laying out these component-vectors or from calculations. The blade is indexed or marked for the planes in which the measurements are taken. From these calculations the radial positions in which the eccentric weights 31, 33 must be positioned to compensate for the unbalance according to its magnitude and location in the blade will be calculated and indexed on the rings 30 and 32.

The invention provides for visually testing the mass sections with the eccentric weights located according to their calculated radial directions for compensating the unbalance. For this purpose a holder 26, which is provided with a cylindrical upwardly facing socket 27 corresponding in diameter to the diameter of the internal periphery $a^2$ of the blade, is secured on cradle 13 at one side of the chuck 18. The vertical axis of socket 27 is transversely aligned with the vertical axis of chuck 18 and the blade $a$ so that the member 26 will swing with the blade and said chuck while the unbalance is being measured. In order that the vertical axis of member 26 may be fixed accurately so that its center of gravity will be in the transverse plane of the axis of the chuck 18, member 26 is secured in cradle 13 by an eccentric stud 28 and nuts 29 which permit accurate adjustment of member 26.

After the blade and mass-sections have been indexed to indicate the radial positions of the eccentric weights in which they will compensate for the measured unbalance in the blade they are placed in the socket 27 in member 26 in radial indexed positions corresponding to their compensating positions in the blade. When the magnitude and location of the unbalance and the radial positions of the weights 31 and 33 are correctly determined, and correspondingly placed to compensate for the unbalance in the member 26, the blade will be shifted to its vertical position by the weights 31, 33 in said member. The blade will then be tested with the members $b$ and $c$ in socket 27, and the blade and weights rotated a like amount from the index point, from which the measurements were calculated. The blade will be tested in at least two radial planes.

The blade will then be removed from the chuck 18, the weights and rings will be lifted out of socket 27 and transferred into the shank of the blade as illustrated in Fig. 9, with the ring 30 seated in the internal periphery $a^2$ and against shoulder $a^3$ of the blade and the ring 32 seated in the counter-bore 34 in ring 30 and rotatively positioned in exact accordance with their relative predetermined and indexed positions in which they were set during the tests for balancing the blade. Any inaccuracy in measurement or calculation of the forces which produce the unbalance will have been corrected by the movement of the blade out of its vertical position during the tests in which the weight-members $b$, $c$ were in the member 26 in the planes which are perpendicular to each other. The radial positions of the weights will then be corrected to produce static balance and to compensate for the unbalance. The compensating effect of the weights 31, 33 will be the same as when they are in corresponding radial directions in the blade and if desired the blade $a$ can again be tested with the weights 31, 33 in the shank $a^1$ as a check against errors in assembly.

The invention exemplifies a method of balancing a propeller blade about its longitudinal axis which comprises adding to and fixing in the shank a uniform mass composed of a plurality of sections provided with eccentric weights and positioning the weights radially in a position outside of and corresponding to their compensating positions in the blade to determine the accuracy and correctness of the calculations of such positions. The invention also exemplifies a machine for use in statically balancing propeller blades about their axes by which the calculated radial positions of the eccentric weights can be readily checked before they are permanently secured in the blade.

The invention is not to be understood as restricted to the details set forth, since these may be modified within the scope of the appended claims without departing from the spirit and scope of the invention.

Having thus described the invention, what I claim as new and desire to secure by Letters Patent is:

1. In an apparatus for balancing a propeller blade, a base member, a pair of spaced supporting arms extending from said base member, a cradle member, a pair of spaced supporting arms extending from said cradle member, a first flexible strip carried by one of said base member arms and secured to one of said cradle member arms, a second flexible strip carried by the other of said base member arms and secured to the other of said cradle member arms, said strips acting to flexibly carry said cradle member to provide for rocking movement of said cradle member, a socket carried by said cradle member intermediate said cradle member arms and adapted to support the blade with its longitudinal axis in a vertical plane and so that said axis will lie in a vertical plane joining said strips, a weight carrying member carried by said cradle member and non-symmetrical, a weight positioned by said carrying member and rotatable therein, the center of rotation of said weight in said carrying member being in the plane joining said strips, said weight being operable upon rotation to counterbalance the unbalance of the propeller blade about its longitudinal axis in a vertical plane perpendicular to the plane joining said strips.

2. Apparatus for statically balancing around its longitudinal axis a propeller blade having a socket in its shank in which an eccentric weight of fixed value is adapted to be rotatively positioned and secured in different angular positions around said axis for compensating for unbalance in different portions of the blade which comprises, a support provided with means for fixedly securing the blade thereon so it extends vertically, said support being mounted so as to be tiltable by an unbalancing mass in the blade fixed on the support, an eccentric weight adapted to be rotatably positioned in said socket around the longitudinal axis of the blade for compensating for the unbalance, and means mounted on and tiltable with the blade-support, outside of the blade, adapted to receive the eccentric weight for rotation on a constant radius into different angular positions while the blade remains tiltable by the unbalance for compensating for the unbalance according to its magnitude and location which is determinative of the radial position in the socket in the blade where the weight will balance the blade.

3. Apparatus for statically balancing around its longitudinal axis a propeller blade having a socket in its shank in which an eccentric weight is adapted to be secured in different radial positions around said axis for compensating for unbalance in different portions of the blade which comprises, a support provided with an upwardly facing chuck for the shank of the blade for fixedly securing the blade in upstanding relation on and above the support, said support being tiltable by an unbalancing mass in the blade on the support, an eccentric weight adapted to be rotatably positioned in said socket around the longitudinal axis of the blade, for compensating for the unbalance, and means mounted on and tiltable with the blade-support, on which the weight is exposed horizontally rotatable on a fixed vertically extending axis parallel to and relatively offset from the longitudinal axis of the blade into different radial positions while the blade remains tiltable by the unbalance to compensate for the unbalance according to its magnitude and determining the radial position in the socket in the blade where the weight will balance the blade.

4. Apparatus for statically balancing around its longitudinal axis a propeller blade having a socket in its shank in which a plurality of eccentric weights are adapted to be secured in different radial positions around said axis for compensating for unbalance in different portions of the blade which comprises, a support provided with means for fixedly securing the blade thereon so that it extends vertically, said support being mounted so as to be tiltable by an unbalancing mass in the blade secured on the support, a plurality of eccentric weights of fixed values, adapted to be rotatably positioned in said socket around the longitudinal axis of the blade, for compensating for the unbalance, and means mounted on and tiltable with the blade-support, and on which the weights are exposed and rotatable around a common axis parallel and offset relatively to the longitudinal axis of the blade into different radial positions while the blade remains tiltable by the unbalance, for compensating for the unbalance according to its magnitude and location and determining the radial positions in the socket in the blade where the weights will balance the blade.

5. Apparatus for statically balancing around its longitudinal axis a propeller blade having a socket in its shank in which eccentric weights are adapted to be secured in different radial positions around said axis for compensating for unbalance in different portions of the blade which comprises, a support provided with means for fixedly securing the blade thereon so that it extends vertically, said support being mounted so as to be tiltable by unbalance in the blade secured on the support, a plurality of eccentric weights of fixed values and different radii, adapted to be rotatably positioned in said socket and relatively to each other around the longitudinal axis, for compensating for the unbalance, and means mounted on and tiltable with the blade-support, horizontally offset with respect to the axis of the blade and on which the weights are horizontally rotatable around a common axis parallel to and relatively offset from the longitudinal axis of the blade into different radial positions while the blade remains tiltable by the unbalance for compensating for the unbalance according to its magnitude and location and determining the radial positions in the socket in the blade where the weights will balance the blade.

6. Apparatus for statically balancing around its longitudinal axis a propeller blade having a socket in its shank in which eccentric weights are adapted to be secured in different radial positions around said axis for compensating for unbalance in different portions of the blade which comprises, a support provided with an upwardly facing chuck for the shank of the blade for fixedly securing the blade in upstanding relation on and above the support, said support being mounted so as to be tiltable by an unbalancing mass in the blade secured on the support, a plurality of eccentric weights for compensating for the unbalance, and an upwardly facing chuck at one side of the blade-chuck, on and tiltable with the blade-support, and in which the weights are exposed and rotatable around a common axis into different radial positions while the blade remains tiltable by the unbalance for compensating for the unbalance according to its magnitude and location and determining the radial positions in the socket in the blade where the weights will balance the blade.

HARRY P. REIBER.